(12) United States Patent
Kuo et al.

(10) Patent No.: US 9,410,574 B2
(45) Date of Patent: Aug. 9, 2016

(54) LINEAR BALL BEARING GUIDEWAY

(71) Applicant: HIWIN TECHNOLOGIES CORP., Taichung (TW)

(72) Inventors: Chang-Hsin Kuo, Taichung (TW); Sheng-Hsiang Huang, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 88 days.

(21) Appl. No.: 14/519,458

(22) Filed: Oct. 21, 2014

(65) Prior Publication Data

US 2016/0108955 A1 Apr. 21, 2016

(51) Int. Cl.
*F16C 19/00* (2006.01)
*F16C 29/06* (2006.01)
*F16C 29/00* (2006.01)
*F16C 29/04* (2006.01)

(52) U.S. Cl.
CPC ........... *F16C 29/0638* (2013.01); *F16C 29/005* (2013.01); *F16C 29/04* (2013.01)

(58) Field of Classification Search
CPC ........ F16C 29/005; F16C 29/04; F16C 29/06; F16C 29/0633; F16C 29/0635; F16C 29/0638; F16C 29/0642; F16C 29/0654; F16C 29/0659; F16C 29/0671
See application file for complete search history.

(56) References Cited

U.S. PATENT DOCUMENTS

| | | | |
|---|---|---|---|
| 5,273,365 A * | 12/1993 | Kondoh | F16C 29/0635 384/44 |
| 6,132,093 A | 10/2000 | Michioka et al. | |
| 6,210,039 B1 * | 4/2001 | Teramachi | F16C 29/0638 384/43 |
| 8,414,190 B2 | 4/2013 | Kishi et al. | |

* cited by examiner

*Primary Examiner* — James Pilkington
(74) *Attorney, Agent, or Firm* — Wang Law Firm, Inc.

(57) ABSTRACT

A linear ball bearing guideway is provided with six rows of balls disposed between the slider and the rail, so as to improve the overall load capacity. The six rows of balls are symmetrically disposed at two sides of the head portion of the rail, and the three of the six rows of balls at each side are located at different heights. The neck-portion width of the head portion is smaller than a distance between the two rows of balls disposed at the lowest rail rolling grooves, but larger than the value of a distance between the two rows of balls in the highest rail rolling grooves minus a diameter of the balls, which ensures that the neck-portion width is overly small and affect the stiffness of the rail.

8 Claims, 9 Drawing Sheets

LINEAR BALL BEARING GUIDEWAY

BACKGROUND OF THE INVENTION

1. Field of the Invention

The present invention relates to a linear transmission device, and more particularly to a linear ball bearing guideway with increased load capacity and stiffness in downward direction.

2. Description of the Prior Art

Linear ball bearing guideway is an important linear transmission device, and has been widely used on different transportation devices because of its advantages of high efficiency and accuracy. Rated static load capacity and stiffness are two important considerations when choosing linear ball bearing guideways, especially, the rated static load capacity and stiffness in the downward direction are very important. The rated static load capacity of a linear ball bearing guideway is usually in direct proportion to the number of rows of balls and the diameter of the balls. Therefore, increasing the ball diameter or the number of row of the balls is a measure usually taken to increase the rated static load capacity. However, the existing linear ball bearing guidways are mostly not designed to strengthen the rated static load capacity and stiffness in the downward direction, therefore, the rated static load capacity and stiffness in the downward direction are generally low.

FIG. 1 shows a linear ball bearing guideway 10 disclosed in U.S. Pat. No. 6,132,093, which is a conventional technology for increasing the rated static load capacity and stiffness in the downward direction. The linear ball bearing guideway 10 generally comprises: a slider 11 slidably mounted on a rail 12, and four rows of balls 13 disposed between the slider 11 and the rail 12. The number of the rows of balls of the linear ball bearing guideway 10 is increased from 2 to 4 as compared with other linear ball bearing guideways, so as to increase the rated static load capacity of the linear ball bearing guideway 10. Two rows of balls 13 are disposed at the top of the rail 12, and another two rows of balls 13 are disposed at two sides of the rail 12. However, by looking at the arrangements of the four rows of balls 13, we can see that the two rows of balls 13 at the top of the rail 12 are only capable of bearing the load in the downward direction, but totally unable to bear any load in the lateral direction, while the two rows of balls 13 at two sides of the rail 12 are able to bear the load only in the lateral direction, but totally unable to bear any of the load in the downward direction. In general, the load capacity cannot be considerably improved in both downward and lateral directions. The load capacity might be improved in the downward direction but not in the lateral direction, as a result, the load capacity in general is still not sufficient to enable the linear ball bearing guideway to be applicable to most machines. Furthermore, due to the fact that both the top surface and lateral surfaces of the rail 12 are provided with rolling grooves for reception of the balls 13, the rail 12 must be subjected to a top grinding process and a lateral grinding process, which substantially increases manufacturing cost and reduces manufacturing efficiency. Besides, the two grinding processes have different grinding datum, which may result in position error of the rolling grooves at the top surface and the lateral surfaces, and reduces the accuracy of the ball bearing guideway.

As shown in FIG. 2, a linear ball bearing guideway 20 which is disclosed in U.S. Pat. No. 8,414,190 also comprises: a slider 21 slidably mounted on a rail 22, and the number of rows of the balls 23 is increased from 2 to 8 as compared with general linear ball bearing guideways. Also due to the fact that both the top surface and lateral surfaces of the rail 22 are provided with four rolling grooves, and the two lateral surfaces are inclined toward the bottom of the rail 22, the rail 22 must be subjected to a top grinding process and a lateral grinding process. Therefore, this linear ball bearing guideway 20 also has the defects of high manufacturing cost, and low manufacturing efficiency and accuracy. Besides, the linear ball bearing guideway 20 is considerably increased in size, because of the arrangement of the 8 rows of balls.

The present invention has arisen to mitigate and/or obviate the afore-described disadvantages.

SUMMARY OF THE INVENTION

The primary objective of the present invention is to provide a linear ball bearing guideway with increased load capacity in downward direction, which is capable of increasing the overall rated static load capacity, and overcoming the problem of the conventional linear ball bearing guideway that two grinding processes must be used in order to increase load capacity, and two grinding processes have different grinding datum, which may result in position error of the rolling grooves at the top surface and the lateral surfaces, and reduces the accuracy of the ball bearing guideway. The present invention is also capable of improving the stiffness (specially in the downward direction) of the linear ball bearing guideway, without increasing the size of the guideway.

To achieve the above objective, a linear ball bearing guideway in accordance with the present invention comprises:

a rail being an elongated structure extending along a direction X, two directions perpendicular to the direction X being defined as a direction Y and a direction Z which is perpendicular to the direction Y, a cross section of the rail in the direction X being a symmetrical structure with respect to a symmetrical axis, the rail including a head portion, a neck portion and a bottom portion which are sequentially arranged in the direction Z, the head portion being located at an upper position than the bottom portion along the direction Z, a direction of the head portion along the direction Z being defined as an upper direction which extends from a bottom of the head portion to a top of the head portion, and a direction of the bottom portion along the direction Z being defined as a lower direction, the head portion having a first maximum width in the direction Y defined as a head-portion width, the neck portion having a minimum width in the direction Y defined as a neck-portion width, the bottom portion including a second maximum width in the direction Y defined as a bottom-portion width, and the neck-portion width is smaller than the head-portion width and the bottom-portion width, both sides of the rail with respect to the symmetrical axis being symmetrically provided with three rail rolling grooves;

a slider including an opening via which the slider is allowed to be slidably sleeved onto the rail, the slider being provided with six slider rolling grooves which are aligned with the rail rolling grooves;

a plurality of balls rotatably disposed between the slider rolling grooves and the rail rolling grooves. The linear ball bearing guideway is characterized in that:

the three rail rolling grooves are an upper rail rolling groove, a middle rail rolling groove and a lower rail rolling groove which are formed at both sides of the head portion of the rail with respect to the symmetrical axis, the upper rail rolling groove is located higher than the middle rail rolling groove in the direction Z, and the middle rail rolling groove is located higher than the lower rail rolling groove in the direction Z;

there are contact points between the balls and each of the upper, middle and lower rail rolling grooves, and each of the contact points is provided with a normal line, each of the normal lines of the balls in the upper and middle rail rolling grooves defines a contact angle α of 20-70 degrees with respect to the upper direction of the direction Z, the normal line in the lower rail rolling grooves defines a contact angle α of 20-70 degrees with respect to the lower direction of the direction Z.

The six rows of balls disposed between the rail and the slider increase the rated static load capacity of the linear ball bearing guideway of the present invention. Meanwhile, the neck portion of the rail is designed at an appropriate width to maintain the stiffness of the rail, especially, the stiffness in the downward direction. Furthermore, the rail rolling grooves are symmetrically disposed at two sides of the rail, so that the rail of the present invention only needs to be subjected to a single grinding process, therefore, manufacturing procedure is simplified and the manufacturing efficiency is improved. Besides, the present invention also solves the problem of the conventional linear ball bearing guideway that the two grinding processes have different grinding datum, which may result in position error of the rolling grooves at the top surface and the lateral surfaces, and reduces the accuracy of the ball bearing guideway. Finally, due to optimum spatial design, the size of the linear ball bearing guideway of the present invention is not increased, which enables the linear ball bearing guideway of the present invention to be applicable to most machines.

DETAILED DESCRIPTION OF THE PREFERRED EMBODIMENTS

Figure 1:
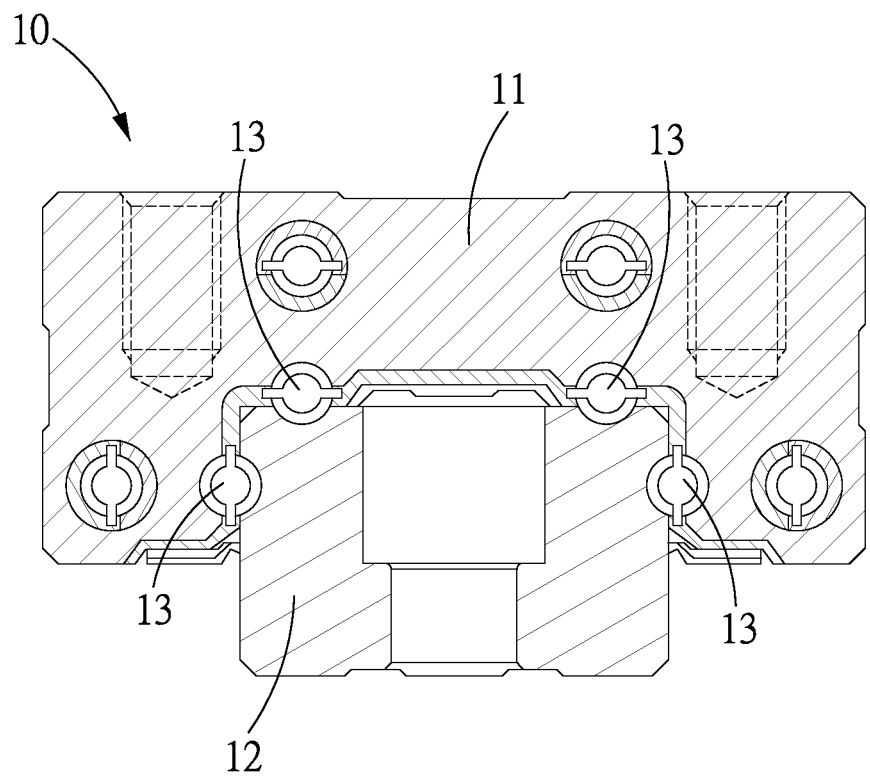
FIG. 1 is a cross sectional view of a conventional ball bearing guideway.
Figure 2:
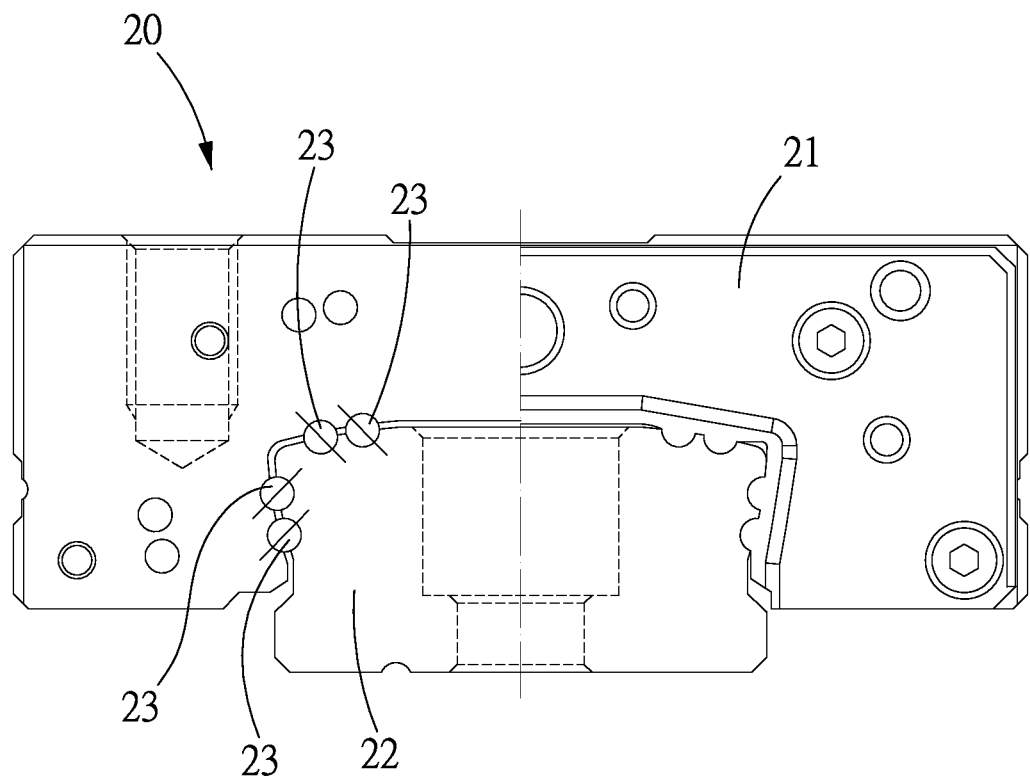
FIG. 2 is an illustration view of another conventional ball bearing guideway.
Figure 3:
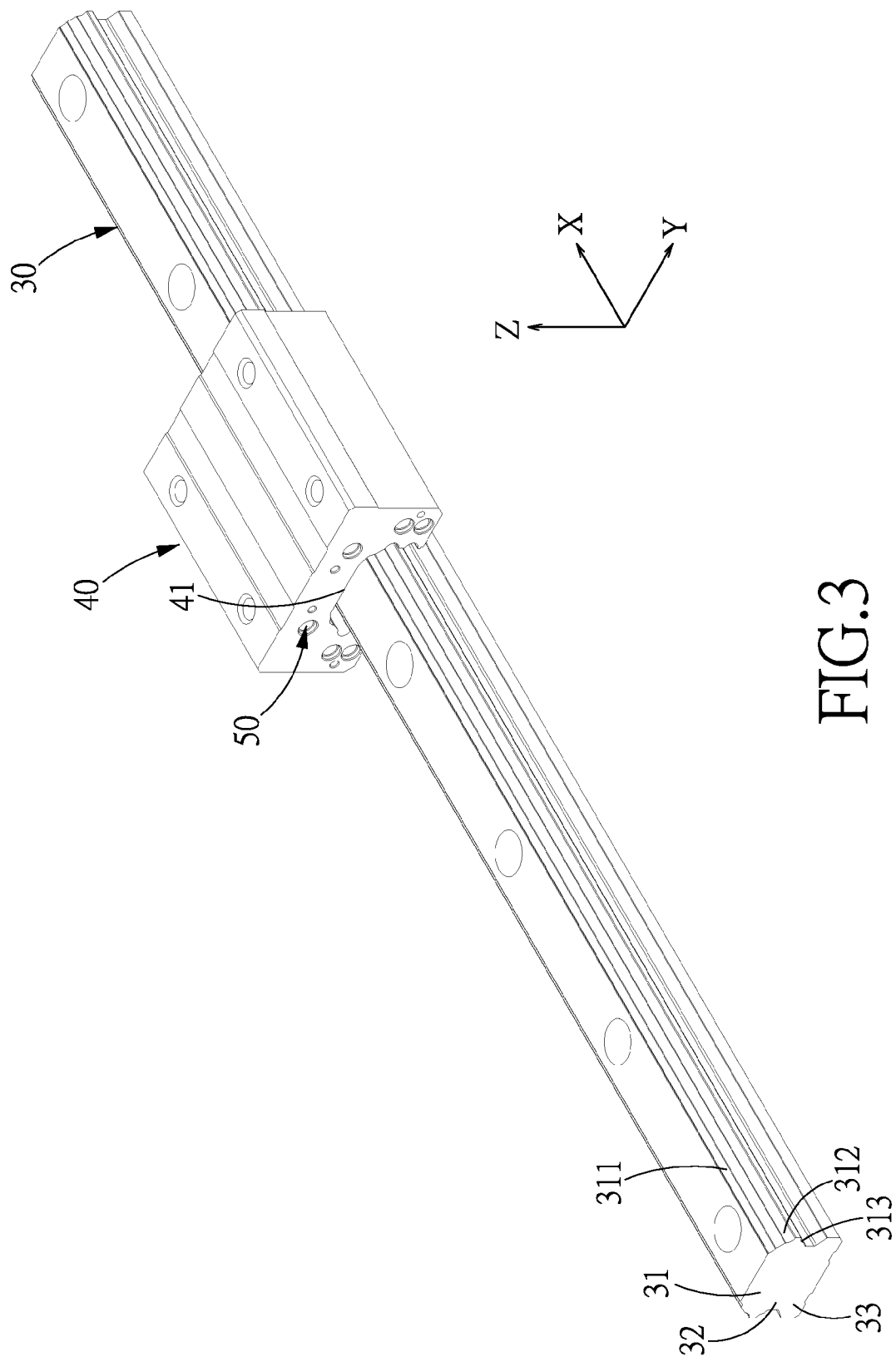
FIG. 3 is an assembly view of a linear ball bearing guideway in accordance with a preferred embodiment of the present invention.

The present invention will be clearer from the following description when viewed together with the accompanying drawings, which show, for purpose of illustrations only, the preferred embodiment in accordance with the present invention.

Referring to FIGS. 3-9, a linear ball bearing guideway in accordance with a preferred embodiment of the present invention comprises: a rail 30, a slider 40 and a plurality of balls 50.

The rail 30 is an elongated structure extending along a direction X, two directions perpendicular to the direction X are defined as a direction Y and a direction Z which is perpendicular to the direction Y. The cross section of the rail 30 in the direction X is a symmetrical structure with respect to a symmetrical axis L.

The rail 30 includes a head portion 31, a neck portion 32 and a bottom portion 33 which are sequentially arranged in the direction Z. The head portion 31 is located at an upper position than the bottom portion 33 along the direction Z, the direction of the head portion 31 along the direction Z is defined as an upper direction which extends from a bottom of the head portion 31 to a top of the head portion 31, and the direction of the bottom portion 33 along the direction Z is defined as a lower direction. The head portion 31 has a first maximum width in the direction Y defined as a head-portion width W1, the neck portion 32 has a minimum width in the direction Y defined as a neck-portion width W2, the bottom portion 33 has a second maximum width in the direction Y defined as a bottom-portion width W3, and W2 is smaller than W1 and W3. At both sides of the rail 30 with respect to the symmetrical axis L are symmetrically provided three rail rolling grooves. In this embodiment, the three rail rolling grooves are an upper rail rolling groove 311, a middle rail rolling groove 312 and a lower rail rolling groove 313 which are formed at both sides of the head portion 31 of the rail 30 with respect to the symmetrical axis L. The upper rail rolling groove 311 is located higher than the middle rail rolling groove 312 in the direction Z, and the middle rail rolling groove 312 is located higher than the lower rail rolling groove 313 in the direction Z. The upper and middle rail rolling grooves 311, 312 are located at the upper half of the head portion 31, and the lower rail rolling groove 313 is located at the lower half of the head portion 31.

The slider 40 includes an opening 41 via which the slider 40 can be slidably sleeved onto the rail 30. The slider 40 is provided with six slider rolling grooves 411 which are aligned with the upper, middle, lower rail rolling grooves 311, 312, 313 of the rail 30.

The balls 50 are rotatably disposed between the slider rolling grooves 411 and the upper, middle and lower rail rolling grooves 311, 312, 313. When the balls 50 are in the upper, middle and lower rail rolling grooves 311, 312, 313, a distance between centers of the two balls 50 received in the two upper rail rolling grooves 311 along the direction Y is defined as a first ball-center distance d1, a distance between centers of the two balls 50 received in the two middle rail rolling grooves 312 along the direction Y is defined as a second ball-center distance d2, and a distance between centers of the two balls 50 received in the two lower rail rolling grooves 313 along the direction Y is defined as a third ball-center distance d3. The neck-portion width W2 is smaller than d2 and d3. The stiffness of the linear ball bearing guideway is related with the cross sectional area of the rail. The neck portion 32 is the smallest cross sectional area of the rail 30, and is a very important area which affects the structural stiffness. To improve the stiffness of the linear ball bearing guideway, the neck-portion width W2 in this embodiment is designed to be greater than the first ball-center distance d1, so as to obtain an optimum stiffness. When there is a space limitation, the neck-portion width W2 in this embodiment can also be designed to be greater than the value of the first ball-center distance d1 minus the diameter of the balls 50, namely, W2>(d1−d), d is the diameter of the balls, which also can obtain a suboptimal stiffness. The third ball-center distance d3 is preferably relatively big to prevent manufacturing interference of the lower rail rolling grooves 313 with the neck portion 32. More preferably, the neck-portion width W2 is smaller than the third ball-center distance d3 minus the diameter of the balls 50, namely, W2<(d3−d).

When the balls 50 are received in the upper, middle and lower rail rolling grooves 311, 312, 313, the conditions of the balls 50 and the upper, middle and lower rail rolling grooves 311, 312, 313 satisfy with the assumption of the Hertz contact theory. There is a contact point T between the balls 50 and each of the upper, middle and lower rail rolling groove 311, 312, 313. On a contact surface of the ball 50 or the contact surface of each of the upper, middle and lower rail rolling grooves 311, 312, 313 is defined a normal line N which passes through the contact point T. Each of the normal lines N of the balls 50 in the upper and middle rail rolling grooves 311, 312 defines a contact angle α of 20-70 degrees with respect to the upper direction of the direction Z. From the viewpoint of manufacturing, if the contact angle α is smaller than 20 degrees, the area of the contact surface of the balls 50 that comes into contact with the upper, middle and lower rail rolling grooves 311, 312, 313 will be reduced, which finally results in reduction in the load capacity of the contact surface. Contrarily, the load capacity of the balls 50 or the upper, middle and lower rail rolling grooves 311, 312, 313 in the direction Z will also be reduced, if the contact angle α is larger than 70 degrees, so the high stiffness in the downward direction of the present invention cannot be achieved. More preferably, the contact angle α is 30-50 degrees, and optimally, 40 degrees, so as to prevent the problems caused by manufacturing stability, and improve the stiffness in the downward direction. From the viewpoint that the deformation amounts of the balls 50 and the upper and middle rail rolling grooves 311, 312 must be equal (after the balls 50 and the upper and middle rail rolling grooves 311, 312 are subjected to a force), the contact angles α of the upper and middle rail rolling grooves 311, 312 are preferably equal. Similarly, each of the normal lines N of the balls 50 in the lower rail rolling grooves 313 defines a contact angle α of 20-70 degrees with respect to the lower direction of the direction Z. The contact angle α is preferably 30-50 degrees, and optimally 40 degrees.

Figure 6:
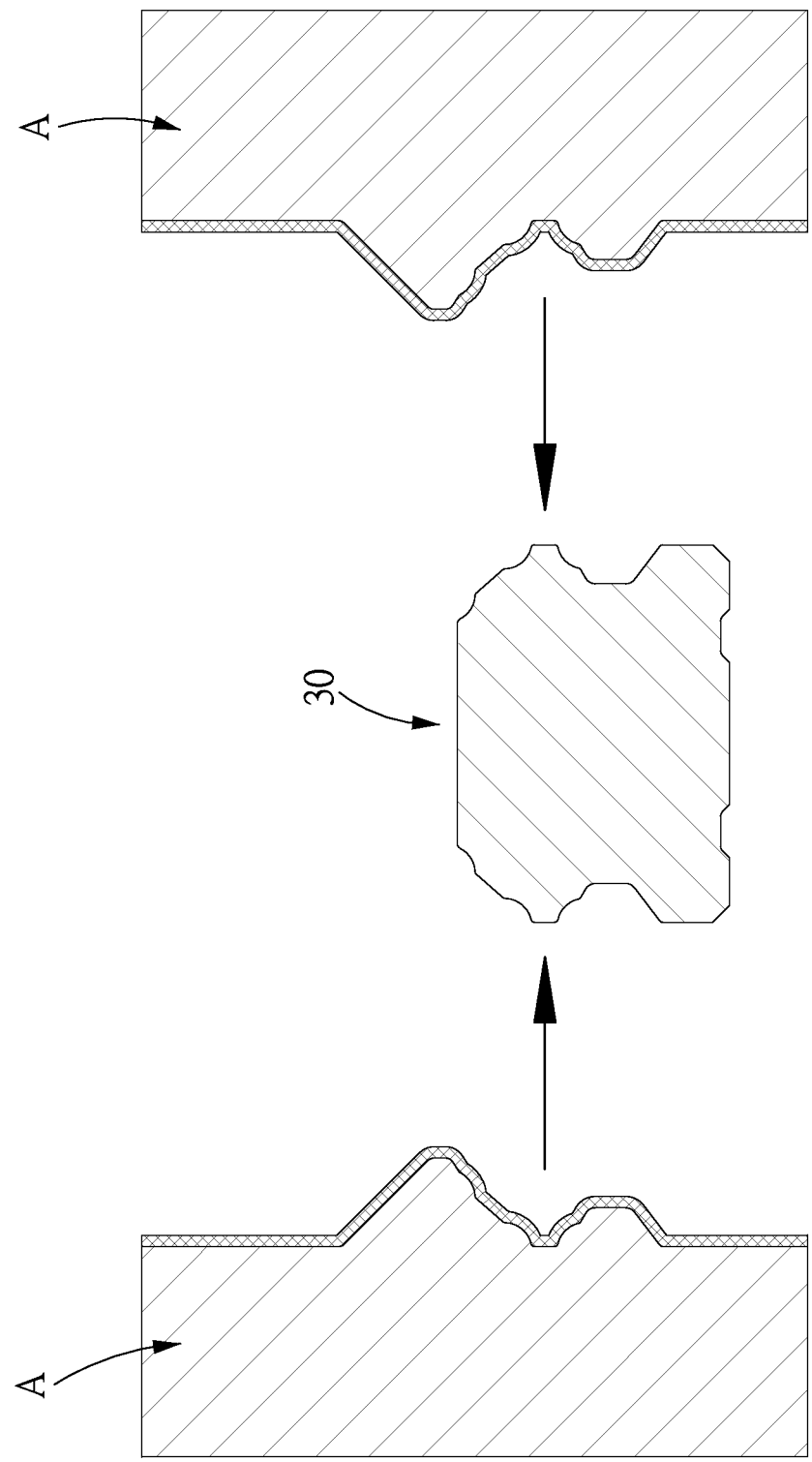
FIG. 6 is an operational view showing that the linear ball bearing guideway in accordance with the present invention is subjected to a lateral grinding process.

What mentioned are the structural relations and features of the linear ball bearing guideway in accordance with the present invention. It is to be noted that the upper, middle and lower rail rolling grooves 311, 312, 313 are arranged at both sides of the rail 30 in a symmetrical manner, and the top surface of the rail 30 is provided with no rolling grooves. Therefore, the rail 30 needs to be subjected to a single lateral grinding process only, which is carried out by two lateral grinding members A at two lateral sides of the rail 30, as shown in FIG. 6. The present invention does not require the top grinding process or any other grinding process in other directions, therefore, manufacturing procedure is simplified and the manufacturing efficiency is improved. Besides, the present invention also solves the problem of the conventional linear ball bearing guideway that the two grinding processes have different grinding datum, which may result in position error of the rolling grooves at the top surface and the lateral surfaces, and reduces the accuracy of the ball bearing guideway.

Figure 4:
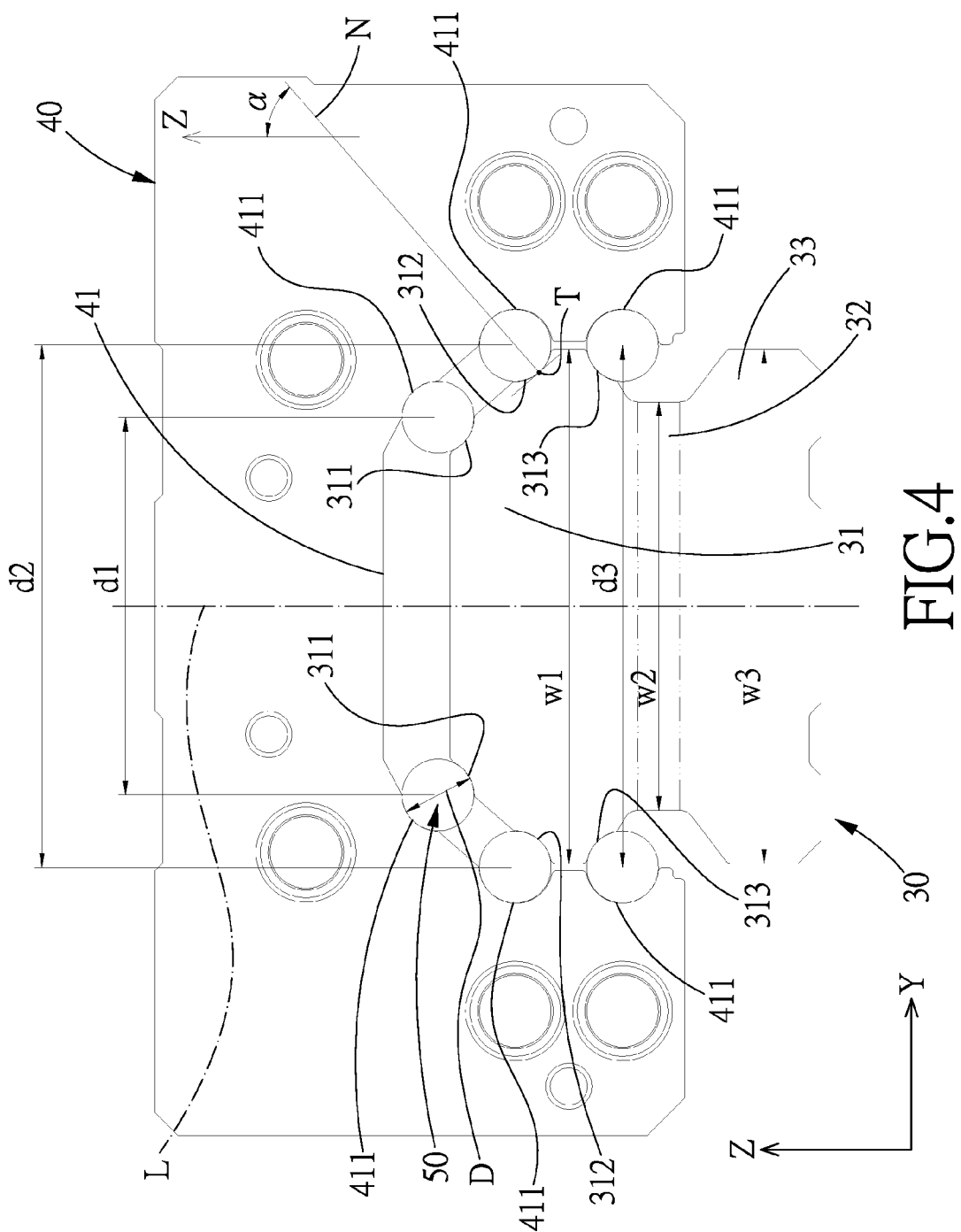
FIG. 4 is an end view of the linear ball bearing guideway in accordance with the present invention.
Figure 5:
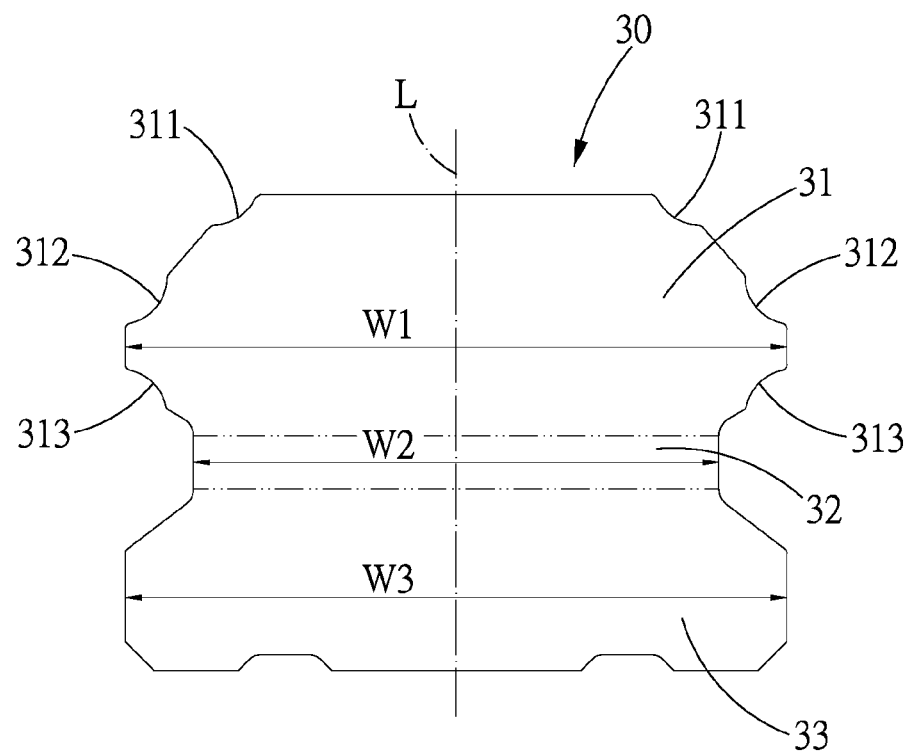
FIG. 5 is a plan view of the linear ball bearing guideway in accordance with the present invention.
Figure 5:
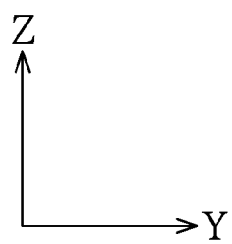
Figure 7:
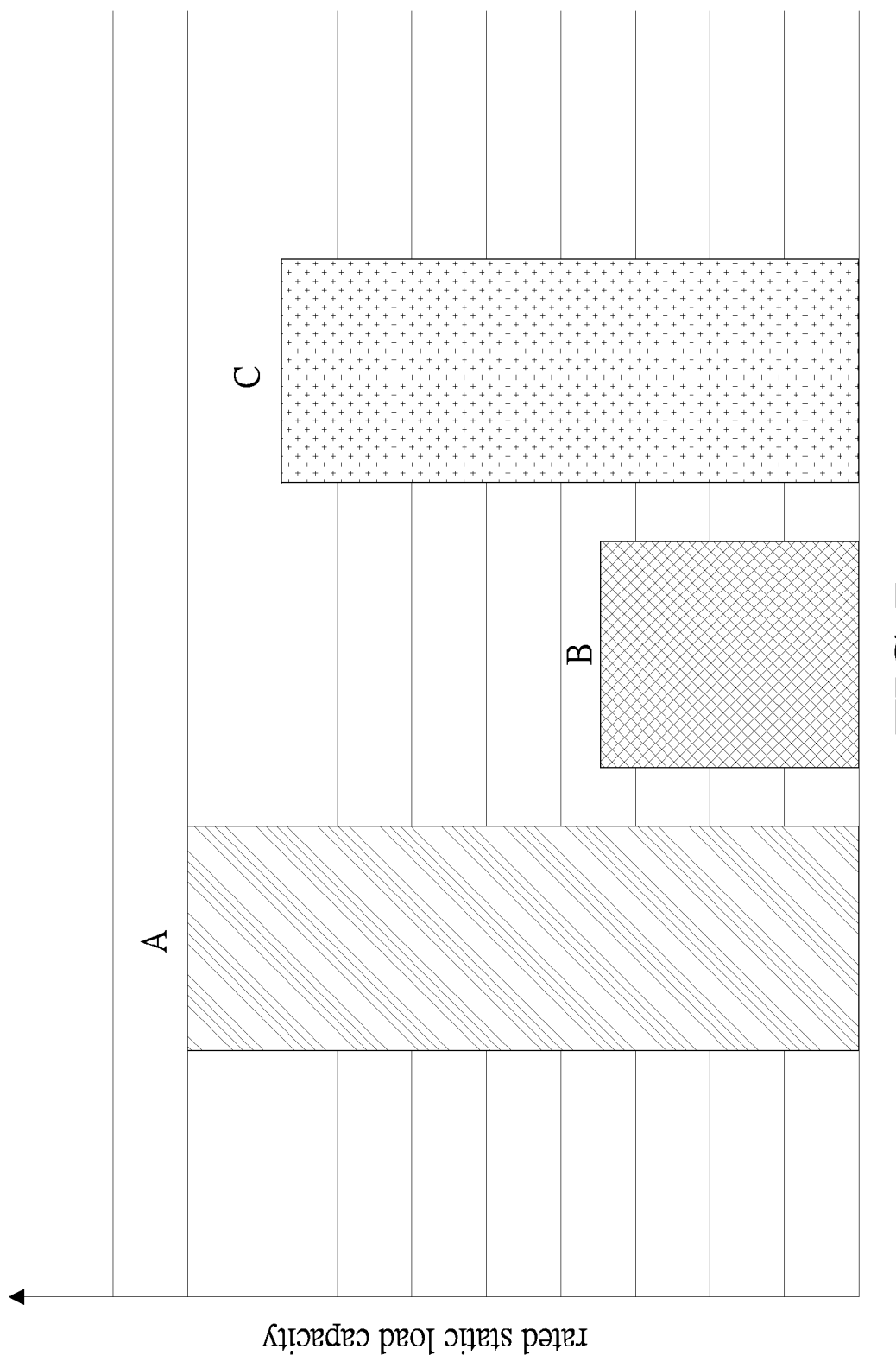
FIG. 7 is a diagram showing the comparison of the rated static load capacity between the present invention and two conventional products.

The rated static load capacity of the present invention is directly proportional to the number of balls of each row and to the number of rows of the balls of the entire ball bearing guideway. The present invention totally has six rows of balls, which provides relatively high rated static load capacity, as compared with the linear ball bearing guideway with two or four rows of balls. Besides, the cross sectional area of the rail directly affects the stiffness of the linear ball bearing guideway. While increasing the number of rows of the balls 50, the present invention also limits the neck-portion width W2 as mentioned above, so that the neck width W2 of the neck portion won't be reduced, by the increase of the number of rows of the balls 50, to the extent that might affect the stiffness of the rail 30. The present invention increases the number of rows of the balls 50 while maintaining the neck-portion width W2, so as to improve the stiffness of the rail 30 and extend the life of the same. In order to improve the stiffness and the rated static load capacity, in particularly in the downward direction, the upper half of the head portion 31 of the rail 30 is provided with four rail rolling grooves 311, 312 (two rail rolling grooves at each side make four in total), and the lower half of the head portion 31 is provided with only two rail rolling grooves 313 (as shown in FIG. 4), namely, the upper and middle rail rolling grooves 311, 312 are located at the upper half of the head portion 31, and the lower rail rolling grooves 313 are formed at the lower half of the head portion 31. Please see the comparison of the rated static load capacity between the present invention and two conventional products, as shown in FIG. 7, wherein the vertical axis represents the rated static load capacity in the downward direction, the column A at the leftmost represents the rated static load capacity of the linear ball bearing guideway of the present invention in the downward direction, the column B in the middle represents the rated static load capacity in the downward direction of a general conventional linear ball bearing guideway of the same size as the present invention, and the column C at the rightmost represents the rated static load capacity in the downward direction of a conventional linear ball bearing guideway with increased load capacity in the downward direction. FIG. 7 clearly shows that the rated static load capacity in the downward direction of the present invention is way higher than the general conventional linear ball bearing guideway, and is also obviously higher than the conventional linear ball bearing guideway (under the condition that the linear ball bearing guideways compared on the same size).

Figure 8:
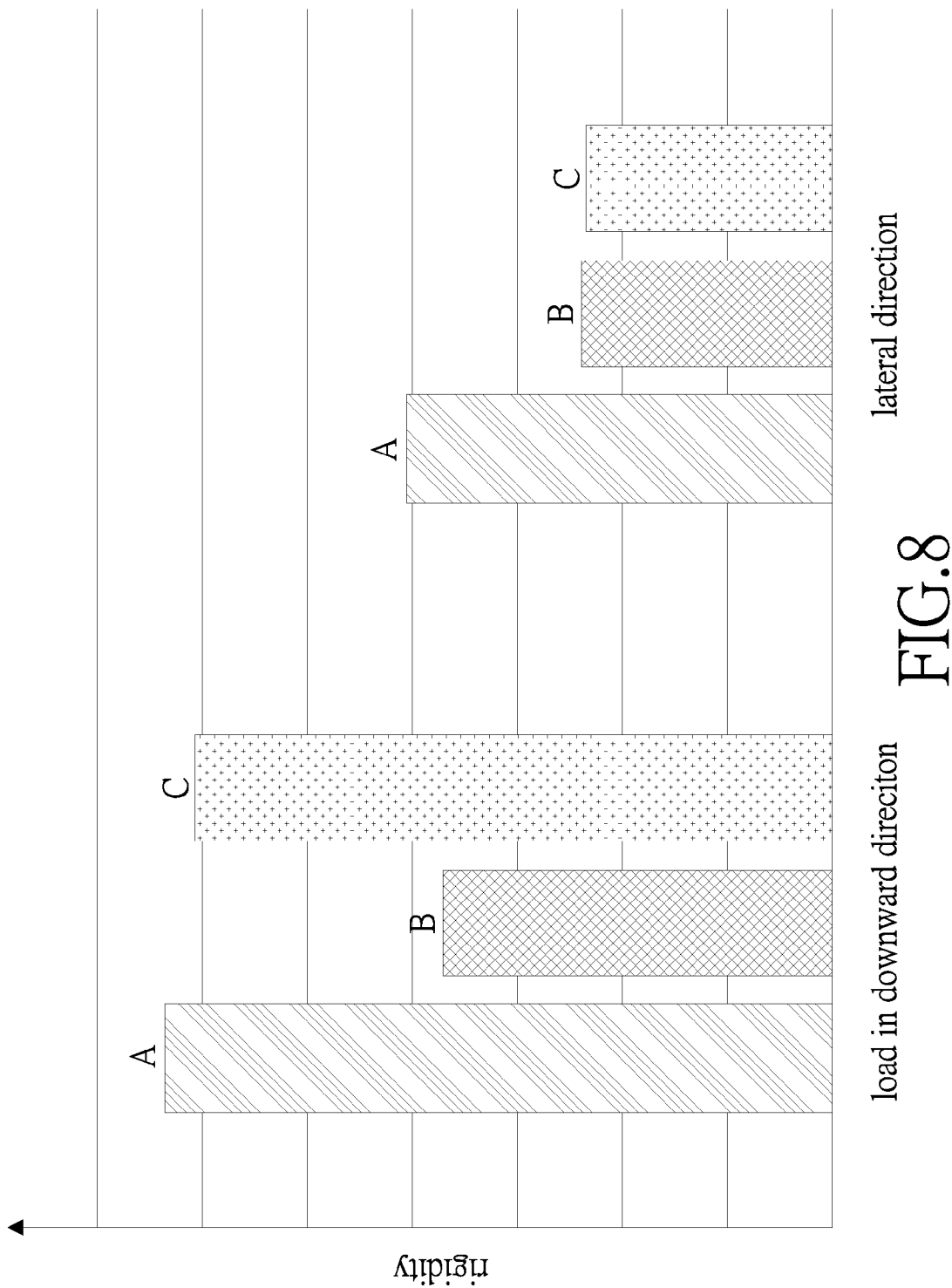
FIG. 8 is a diagram showing the comparison of the stiffness in the downward and lateral directions between the present invention and two conventional linear ball bearing guideways.

The stiffness of the linear ball bearing guideway is also directly proportional to the number of rows of the balls of the entire ball bearing guideway, therefore, the linear ball bearing guideway of the present invention with six rows of balls of the present invention provides higher stiffness than the conventional linear ball bearing guideways with two or four rows of balls. Please see the comparison of the stiffness in the downward and lateral directions between the present invention and two conventional linear ball bearing guideways as shown in FIG. 8, wherein the vertical axis represents the stiffness of the linear ball bearing guideway in the downward or lateral direction, the columns A show the stiffness of the linear ball bearing guideway of the present invention, the columns B represent the stiffness of a general conventional linear ball bearing guideway, and the columns C show the stiffness of a conventional linear ball bearing guideway with increased load capacity in the downward direction. FIG. 8 clearly shows that the stiffness in the downward direction of the present invention is way higher than the general conventional linear ball bearing guideway, and is also obviously higher than the conventional linear ball bearing guideway with increased load capacity in the downward direction. Furthermore, the stiffness in the lateral direction of the present invention is way higher than the general conventional linear ball bearing guideway, and is also obviously higher than the conventional linear ball bearing guideway (under the condition that the linear ball bearing guideways compared on the same size).

Figure 9:
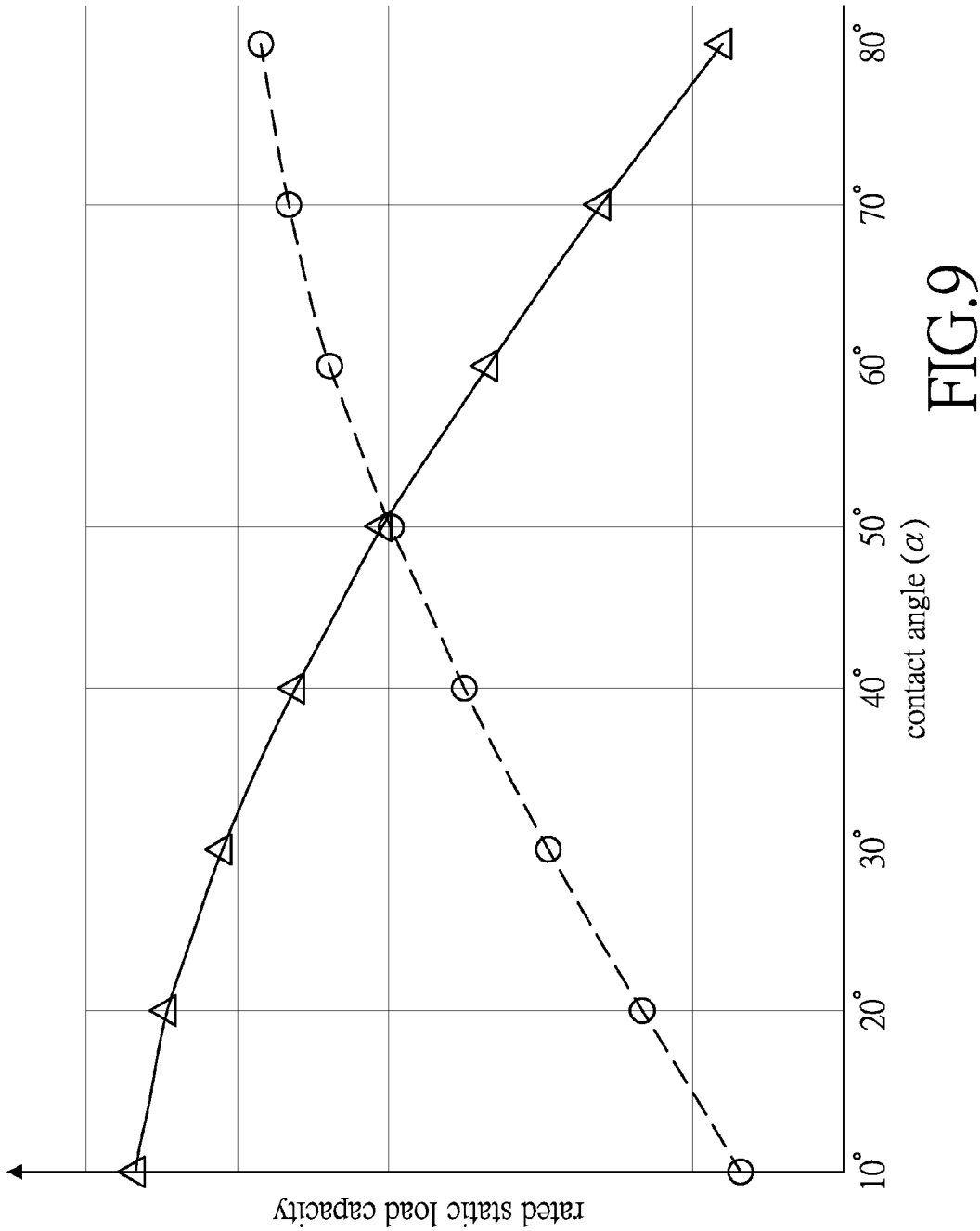
FIG. 9 is a data diagram showing the relation between the contact angle α and the rated static load capacities in the downward and lateral directions.

On the other hand, the contact angle of each of the balls 50 and the middle rail rolling grooves 312 is 20-70 degrees. Please refer to FIG. 9, which is a data diagram showing the relation between the contact angle α and the rated static load capacities in the downward and lateral directions, wherein the vertical axis represents the rated static load capacity of the linear ball bearing guideway, the solid line (the triangle data points) represents the rated static load capacity in the downward direction, and the dotted line (round data points) represents the rated static load capacity in the lateral direction. Reducing the contact angle α can increase the rated static load capacity in the downward direction, but also considerably decreases the rated static load capacity in the lateral direction. FIG. 9 shows that, when the contact angle α is smaller than 20 degrees, the rated static load capacity in the lateral direction continuously declines, while the increase of the rated static load capacity in the down direction becomes very slow. Similarly, when the contact angle α is larger than 70 degrees, the rated static load capacity in the downward direction continuously declines, while the increase of the rated static load capacity in the lateral direction is not obvious. Namely, when the contact angle α is smaller than 20 degrees or larger than 70 degrees, the rated static load capacity in the desired direction does not increase too much, but the rated static load capacity in another decreases sharply. The linear ball bearing guideway used on a transport means normally has specific requirements on the rated static load capacity both in downward direction and lateral direction, therefore, the contact angle α is preferably between 20-70 degrees. Furthermore, it can be clearly seen from the curves of FIG. 9 that, when the contact angle α is 50 degrees, the rated static load capacity in the downward direction is approximately equal to the rated static load capacity in the lateral direction. Since the present invention is aimed at improving the rated static load capacity in the downward direction, the contact angle α of the present invention is preferably smaller than 50 degrees, so that the rated static load capacity in the downward direction is larger than the rated static load capacity in the lateral direction. From the viewpoint of the rated static load capacity in the lateral direction, when the contact angle is 30 degrees, the rated static load capacity in the lateral direction has reached a level which is more than half the maximum possible load capacity, namely, the rated static load capacity is great enough. When the contact angle α is larger than 30 degrees, the rated static load capacity in the lateral direction can also be maintained, therefore, the contact angle α is preferably larger than 30 degrees. Namely, the contact angle α is preferably 30-50 degrees, and optimally 40 degrees, because when the contact angle α is 40 degrees, the rated static load capacity in the downward direction is obviously higher than the rated static load capacity in the lateral direction, the rated static load capacity in the downward direction is considerably increased, and a relatively good load capacity in the lateral direction is also maintained.

While we have shown and described various embodiments in accordance with the present invention, it is clear to those skilled in the art that further embodiments may be made without departing from the scope of the present invention.

What is claimed is:

1. A linear ball bearing guideway comprising:
a rail being an elongated structure extending along a direction X, two directions perpendicular to the direction X being defined as a direction Y and a direction Z which is perpendicular to the direction Y, a cross section of the rail in the direction X being a symmetrical structure with respect to a symmetrical axis, the rail including a head portion, a neck portion and a bottom portion which are sequentially arranged in the direction Z, the head portion being located at an upper position along the direction Z, a direction of the head portion along the Z direction being defined as an upper direction which extends from a bottom of the head portion to a top of the head portion, and a direction of the bottom portion along the direction Z being defined as a lower direction which extends from a top of the bottom portion to a bottom of the bottom portion, the head portion having a first maximum width in the direction Y defined as a head-portion width, the neck portion having a minimum width in the direction Y defined as a neck-portion width, the bottom portion including a second maximum width in the direction Y defined as a bottom-portion width, and the neck-portion width being smaller than the head-portion width and the bottom-portion width, both sides of the rail with respect to the symmetrical axis being symmetrically provided with three rail rolling grooves;
a slider slidably sleeved onto the rail, the slider being provided with six slider rolling grooves which are aligned with the rail rolling grooves;
a plurality of balls rotatably disposed between the slider rolling grooves and the rail rolling grooves; the linear ball bearing guideway being characterized in that:
the three rail rolling grooves are an upper rail rolling groove, a middle rail rolling groove and a lower rail rolling groove which are formed at both sides of the head portion of the rail with respect to the symmetrical axis, the upper rail rolling groove is located higher than the middle rail rolling groove in the direction Z, and the middle rail rolling groove is located higher than the lower rail rolling groove in the direction Z;
there are contact points between the balls and each of the upper, middle and lower rail rolling grooves, and each of the contact points is provided with a normal line, each of the normal lines of the upper and middle rail rolling grooves defines a contact angle of 20-70 degrees with respect to the upper direction of the direction Z, the normal line in the lower rail rolling grooves defines a contact angle of 20-70 degrees with respect to the lower direction of the direction Z;
a distance between centers of the balls received in the two upper rail rolling grooves along the direction Y is defined as a first ball-center distance, a distance between centers of the balls received in the two middle rail rolling grooves along the direction Y is defined as a second ball-center distance, and the neck-portion width is greater than the value of the first ball-center distance minus the diameter of the balls.

2. The linear ball bearing guideway as claimed in claim 1, wherein the contact angle of each of the normal lines of the balls in the upper and middle rail rolling grooves is 30-50 degrees, and the contact angle of the normal line in the lower rail rolling grooves is 30-50 degrees.

3. The linear ball bearing guideway as claimed in claim 2, wherein the contact angle of each of the normal lines of the balls in the upper and middle rail rolling grooves is 40 degrees, and the contact angle of the normal line in the lower rail rolling grooves is 40 degrees.

4. The linear ball bearing guideway as claimed in claim 1, wherein the neck-portion width is larger than the first ball-center distance.

5. The linear ball bearing guideway as claimed in claim 1, wherein the neck-portion width is smaller than the second ball-center distance.

6. The linear ball bearing guideway as claimed in claim 1, wherein a distance between centers of the balls received in the two lower rail rolling grooves along the direction Y is defined as a third ball-center distance which is larger than the neck-portion width.

7. The linear ball bearing guideway as claimed in claim 6, wherein the neck-portion width is smaller than the third ball-center distance minus the diameter of the balls.

8. The linear ball bearing guideway as claimed in claim 1, wherein the contact angles of the upper and middle rail rolling grooves with the respect to the direction Z are equal.

* * * * *